(12) United States Patent
Williams et al.

(10) Patent No.: US 8,666,253 B2
(45) Date of Patent: Mar. 4, 2014

(54) RADIO FREQUENCY PHOTONIC TRANSCEIVER

(75) Inventors: Brett A. Williams, Iowa City, IA (US); Kurt S. Schuder, Dallas, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 301 days.

(21) Appl. No.: 12/991,956

(22) PCT Filed: Apr. 30, 2009

(86) PCT No.: PCT/US2009/042299
§ 371 (c)(1),
(2), (4) Date: Nov. 10, 2010

(87) PCT Pub. No.: WO2009/140075
PCT Pub. Date: Nov. 19, 2009

(65) Prior Publication Data
US 2011/0064415 A1    Mar. 17, 2011

Related U.S. Application Data

(60) Provisional application No. 61/052,810, filed on May 13, 2008.

(51) Int. Cl.
*H04B 10/00*    (2013.01)
*H04B 1/38*    (2006.01)

(52) U.S. Cl.
USPC .............. 398/115; 398/135; 398/138; 455/73

(58) Field of Classification Search
USPC .................... 398/115–117; 455/73
See application file for complete search history.

(56) References Cited

U.S. PATENT DOCUMENTS 5,608,565 A *  3/1997  Suzuki et al. ................ 359/237
5,929,430 A    7/1999  Yao et al. ...................... 250/205

(Continued)

FOREIGN PATENT DOCUMENTS

EP    1 860 457 A    5/2007    ............. G01S 13/00
WO    WO00/44074 A    7/2000    ............. H01S 3/098

OTHER PUBLICATIONS

Cohen et al, "High-Q microphotonic electro-optic modulator," Sep. 2001, Solid State Electronics vol. 45 issue 9.*

(Continued)

*Primary Examiner* — Leslie Pascal
*Assistant Examiner* — Casey Kretzer
(74) *Attorney, Agent, or Firm* — Withrow & Terranova, PLLC

(57) ABSTRACT

In a first aspect, the invention includes a radio frequency photonic transceiver, comprising: a radio frequency receiver; a radio frequency photonic transmitter; and a switch between the input of the radio frequency photonic receiver and the output of the radio frequency photonic transmitter. In a second aspect, the invention includes an apparatus, comprising: a radio frequency photonic receiver; a radio frequency photonic transmitter; and a switch between the input of the radio frequency photonic receiver and the output of the radio frequency photonic transmitter. In a third aspect, the invention includes a radio frequency, photonic transceiver, comprising: means for generating a radio frequency modulated optical signal; a radio frequency photonic transmitter; and means for switching between the input of the radio frequency photonic receiver and the output of the radio frequency photonic transmitter. In a fourth aspect, the invention includes a method, comprising: generating a first optical signal; electro-optically generating a first radio frequency signal from the first optical signal; transmitting the first radio frequency signal; receiving a second radio frequency signal; and electro-optically modulating a second optical signal with the frequency of the second radio frequency signal. In a fifth aspect, the invention includes a zero-intermediate frequency radio frequency photonic transmitter-receiver unit. In a sixth aspect, the invention includes a radio frequency photonic transmitter-receiver unit including a direct conversion receiver with receiver output.

26 Claims, 7 Drawing Sheets

(56) References Cited

U.S. PATENT DOCUMENTS

| | | | |
|---|---|---|---|
| 6,389,197 B1 | 5/2002 | Iltchenko et al. | 385/28 |
| 6,473,218 B1 | 10/2002 | Maleki et al. | 359/245 |
| 7,043,271 B1* | 5/2006 | Seto et al. | 455/562.1 |
| 7,085,497 B2* | 8/2006 | Tiemann et al. | 398/107 |
| 7,133,180 B2 | 11/2006 | Ilchenko et al. | 359/237 |
| 7,965,745 B2* | 6/2011 | Maleki et al. | 372/26 |
| 8,311,082 B2* | 11/2012 | Pasternak et al. | 375/219 |
| 2002/0064191 A1* | 5/2002 | Capewell et al. | 372/14 |
| 2005/0227653 A1* | 10/2005 | Green et al. | 455/205 |
| 2006/0238405 A1 | 10/2006 | Wakayama et al. | 342/79 |
| 2007/0197258 A1* | 8/2007 | Oda et al. | 455/554.2 |
| 2008/0001062 A1 | 1/2008 | Gunn et al. | 250/206 |

OTHER PUBLICATIONS

Savchenkov et al, "All-optical Photonic Oscillator with High-Q Whispering Gallery Mode Resonators," Oct. 2004, IEEE International Topical Meeting on Microwave Photonics.*

Hossein-Zadeh et al, "RF Mixing in LiNbO3 microdisk modulator," 2004, Biophotonics/Optical Interconnects and VLSI Photonics/WBM Microcavities.*

Savchenkov et al, All-optical Photonic Oscillator With High-Q Whispering Gallery Mode Resonators (published at IEEE International Topical Meeting on Microwave Photonics, Oct. 2004).*

PCT/US2009/042299 Search Report and Written Opinion dated Aug. 18, 2009.

Cohen D. et al., "*High-Q Microphotonic Electro-Optic Modulator*", Solid State Electronics, Elsevier Science Publishers, Barking, GB, vol. 45, No. 9, (Sep. 1, 2001) pp. 1577-1589—XP004317722.

Cohen D. et al., "*Microphotonic Components for a mm-Wave Receiver*", Solid State Electronics, Elsevier Science Publishers, Barking, GB, vol. 45, No. 3 (Mar. 1, 2001) pp. 495-505 XP004233912.

Hossein-Zadeh et al., "*RF Mixing in LiNbO3 Microdisk Modulator*", BioPhotonics/Optical Interconnects and VLSI Photonics/WBM Microcavitie S., 2004 Digest of the Leos Summer Topical Meetings San Diego, CA, (Jun. 2004) pp. 20-21 XP010727900.

Hossein-Zadeh et al., "*Self-homodyne RF-optical LiNbO3 Microdisk Receiver*", Solid State Electronics, Elsevierr Science Publishers, Barking, GB, vol. 49, No. 8 (Aug. 1, 2005) pp. 1428-1434 XP005044144.

Kwang-Hyun Lee, et al., "*Hybrid Dual-Loop Optoelectronic Oscillators*", Microwave Photonics, (2007) IEEE International Topical Meeting (Oct. 1, 2007), pp. 74-77 XP031157434.

Savchenkov, A. A. et al., "*All-Optical Photonic Oscillator With High-Q Whispering Gallery Mode Resonators*", Microwave Photonics, (2004) IEEE International Topical Meeting on Ogunquit, ME, USA Oct. 4-6, 2004, Piscataway, NJ, USA, IEEE, US, Oct. 4, 2004 pp. 205-208, XP010771558.

* cited by examiner

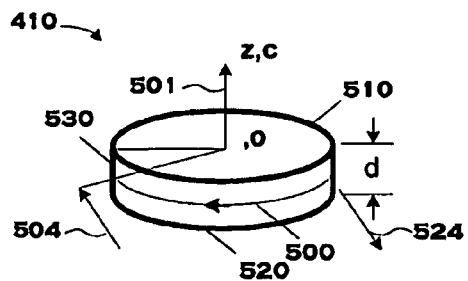 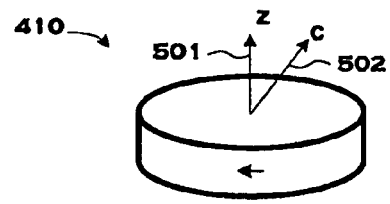
FIG. 5A  FIG. 5B
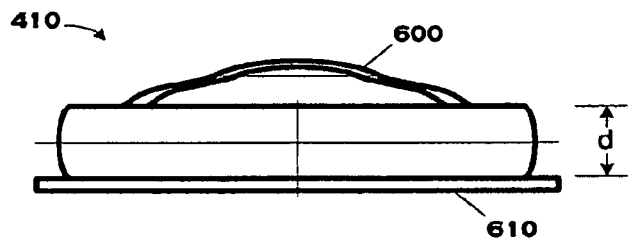
FIG. 6
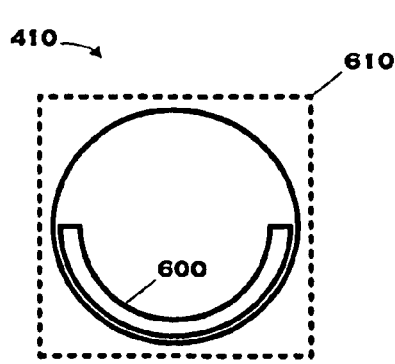 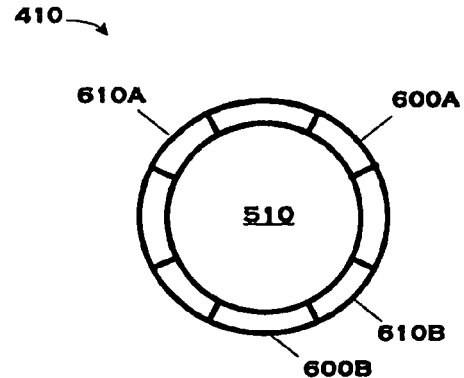
FIG. 7  FIG. 8

RADIO FREQUENCY PHOTONIC TRANSCEIVER

The priority of U.S. Provisional Application Ser. No. 61/052,810, entitled "Radio Frequency Photonic Transceiver", filed May 13, 2008, in the name of the inventors Brett A. Williams and Kurt S. Schuder is hereby claimed under 35 U.S.C. 119(e). This application is also hereby incorporated by reference for all purposes as if set forth verbatim herein.

The earlier effective filing date of co-pending International Application No. PCT/US2009/042299, entitled "Radio Frequency Photonic Transceiver", filed Apr. 30, 2009, in the name of the inventors Brett A. Williams and Kurt S. Schuder is hereby claimed under 35 U.S.C. §365.

BACKGROUND OF THE INVENTION

The present invention pertains to radio frequency transceivers and, more particularly, a radio frequency photonic transceiver.

SUMMARY OF THE INVENTION

In a first aspect, the invention includes a radio frequency photonic transceiver, comprising: a radio frequency receiver; a radio frequency photonic transmitter; and a switch between the input of the radio frequency photonic receiver and the output of the radio frequency photonic transmitter.

In a second aspect, the invention includes an apparatus, comprising: a radio frequency photonic receiver; a radio frequency photonic transmitter; and a switch between the input of the radio frequency photonic receiver and the output of the radio frequency photonic transmitter.

In a third aspect, the invention includes a radio frequency, photonic transceiver, comprising: means for generating a radio frequency modulated optical signal; a radio frequency photonic transmitter; and means for switching between the input of the radio frequency photonic receiver and the output of the radio frequency photonic transmitter. The generating means includes: first means for generating a laser signal; first means for focusing the laser signal; means for electro-optically, actively modulating the focused laser signal with a received radio frequency signal; and means for detecting the modulated laser signal. The radio frequency photonic transmitter includes: second means for generating a laser signal; second means for focusing the laser signal; means for generating a radio frequency signal from an optical signal output by the laser generating means and received through the focusing means; and means for detecting the radio frequency signal.

In a fourth aspect, the invention includes a method, comprising: generating a first optical signal; electro-optically generating a first radio frequency signal from the first optical signal; transmitting the first radio frequency signal; receiving a second radio frequency signal; and electro-optically modulating a second optical signal with the frequency of the second radio frequency signal.

In a fifth aspect, the invention includes a zero-intermediate frequency radio frequency photonic transmitter-receiver unit. In some embodiments, this zero-intermediate frequency radio frequency photonic transmitter-receiver unit may be a variable zero-intermediate frequency radio frequency photonic transmitter-receiver unit.

In a sixth aspect, the invention includes a radio frequency photonic transmitter-receiver unit including a direct conversion receiver with receiver output.

BRIEF DESCRIPTION OF THE DRAWINGS

The invention may be understood by reference to the following description taken in conjunction with the accompanying drawings, in which like reference numerals identify like elements, and in which:

FIG. 5A and FIG. 5B show a disk resonator fabricated from a sphere with two different orientations of the optic axis of the electro-optical crystal;

FIG. 6, FIG. 7, and FIG. 8 show examples of RF electrodes for a disk-like whispering-gallery-mode resonator;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
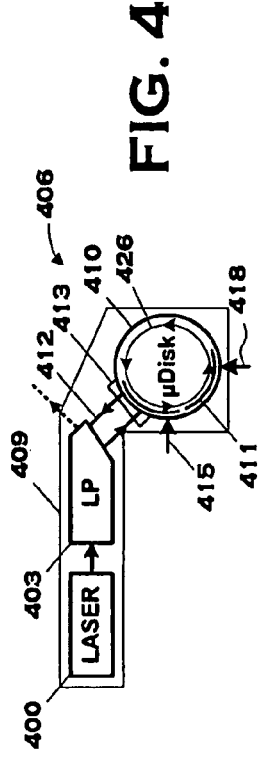
FIG. 1 is a block diagram of one particular embodiment of a radio frequency, photonic transceiver constructed and operated in accordance with one aspect of the present invention.

FIG. 1 is a block diagram of an apparatus 100 constructed and operated in accordance with one aspect of the present invention. The apparatus 100, in the embodiment of FIG. 1, is a radio frequency photonic transceiver. The apparatus 100 comprises a radio frequency photonic receiver ("RFPR")

105, a radio frequency photonic transmitter ("RFPT") 110, and a switch 115. The switch 115 connects the line 128 to the input 120 of the radio frequency photonic receiver 105 or the output 125 of the radio frequency photonic transmitter 110. In operation, the apparatus 100 is typically associated with an antenna (not shown), such that the switch 115 switches the input 120 and output 125 to the antenna in respective receive and transmit modes.

Figure 2:
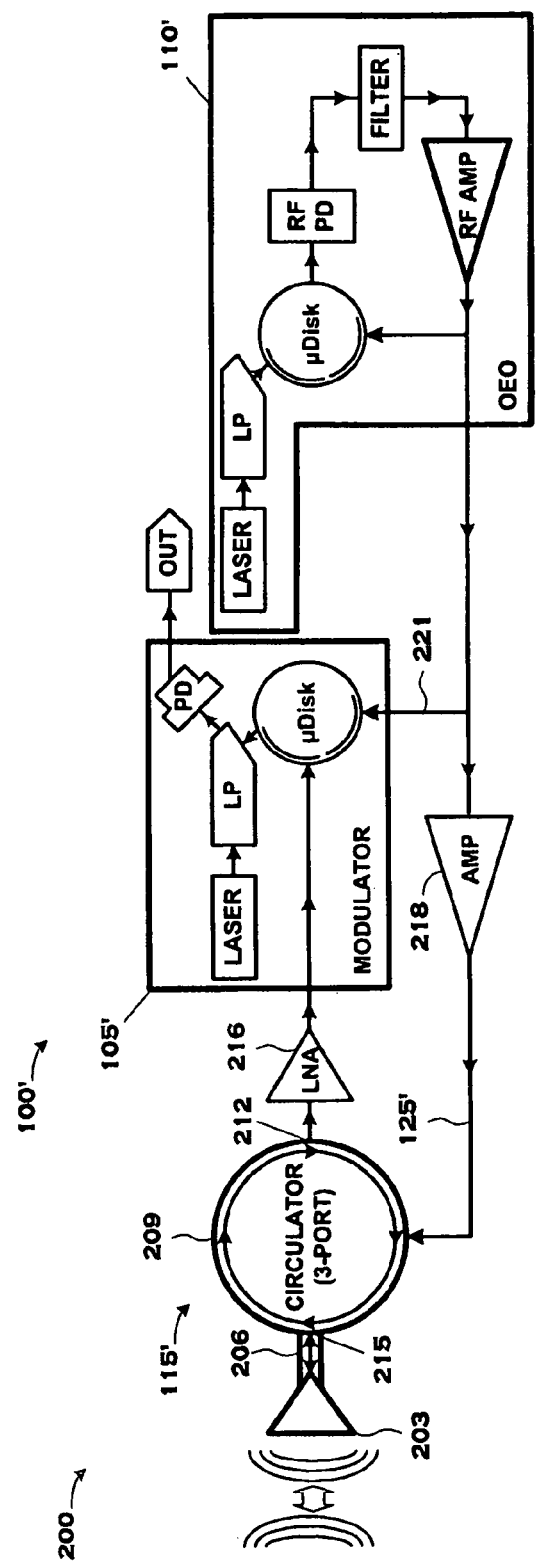
FIG. 2 is a block diagram of one particular embodiment of the transceiver in FIG. 1.

FIG. 2 is a block diagram of one particular embodiment 200 of the apparatus 100 in FIG. 1. More particularly, FIG. 2 depicts a radio frequency photonic transceiver 100' operationally connected to an antenna 203 over an RF connection 206. The RF connection 206 may be made using any suitable means known to the art. RF waveguides, for instance, of various types are frequently used. In the illustrated embodiment, the RF connection 206 is implemented as an RF microstrip line, as will be discussed further below.

The switch 115' in this particular embodiment 200 is implemented as a 3-port circulator 209. Such circulators are well known in the telecommunications arts and any suitable circulator known to that art may be used. The circulator 209 routes an RF signal received via the RF connection 206 or the output 125' to the appropriate output 212, 215, respectively, depending on whether the apparatus 200 is operating in transmit or receive mode.

The radio frequency photonic transceiver 100' comprises a radio frequency photonic receiver 105' and a radio frequency photonic transmitter 110'. The photonic receiver 105', which may also be referred to as a "modulator" or "modulator receiver", is better shown in FIG. 3A. The photonic transmitter 110', which may also be referred to as an "optoelectronic oscillator" ("OEO"), is better shown in FIG. 3B. As will be discussed further below, the photonic transmitter 110' provides a master frequency generator ("MFG") and a local oscillator ("LO") for the radio frequency photonic transceiver 100'.

Figure 3A:
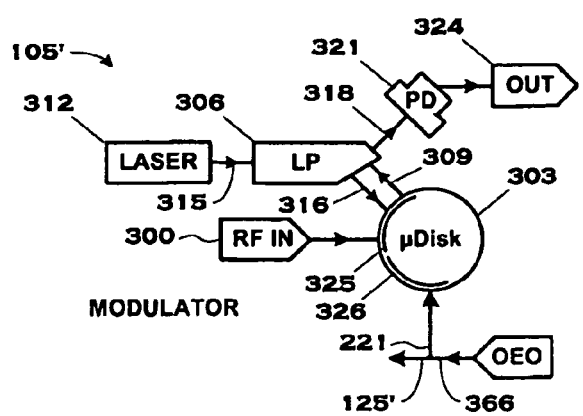
FIG. 3A-FIG. 3B illustrate the receiver and transmitter of the embodiment in FIG. 2 in greater detail.

Referring now to both FIG. 2 and FIG. 3A, in receive mode, the antenna output 300 enters the circulator 209 directing received signals to the receiver 105', then to the low noise amplifier 216, and finally to the photonic receiver 105'. The photonic receiver 105' includes an electro-optically active modulator 303. The electro-optically active modulator 303, as will be discussed in greater detail below, generally comprises a horseshoe-shaped electrode 325 atop a disk resonator 326. The electro-optically active modulator 303 receives the RF input 300 into the disk resonator 326 from the circulator 209 through the LNA 216 via the electrode 325.

The electro-optically active modulator 303 is also evanescent-wave coupled to a lens and prism package ("LP") 306. The lens (not individually shown) collimates the laser diode and the prism (also not individually shown) properly k-matches it. The electro-optically active modulator 303 converts the radio frequency input 300 into an optical signal 309 that is then transmitted to the LP 306. A diode laser 312 outputs a laser signal 315, which passes through the LP 306, the resulting evanescent wave 316 entering the disk resonator 326 of the electro-optically active modulator 303. More particularly, the diode laser 312, LP 306 and disk modulator 303 form an injection locked external cavity diode laser ("ECDL"), creating what is known as a "wavelocker". In the illustrated embodiment, the wavelocker generates a ~200 THz optical laser frequency in the kHz range or less for line width.

The electro-optically active modulator 303 also receives a local oscillator ("LO") signal 221 from the transmitter 110' generated as discussed further below.

The voltage of the RF input 300 modulates the disk index of refraction of the disk resonator 326 at the RF frequency, thereby modulating laser light internal to the disk resonator 326. The internal light originates from the laser signal 312 and the evanescent wave 316. The laser light trapped in the whispering gallery mode of the disk cycles about the periphery (~26 times in this particular embodiment) before exit through evanescent coupling. It is during these multiple cycles that RF modulates laser light, imposing the desired information (i.e., Doppler frequency) on the IR carrier.

The output light 318 is delivered to a baseband photodiode 321. In the illustrated embodiment, "baseband" is, e.g., low pass DC to ≤150 kHz. The resultant modulated optical signal 318 is then detected by an optical detector 321. The optical detector 321 then converts the modulated optical signal 318 into an output electrical signal 324 representative of the modulated optical signal 318. The output electrical signal 324 is then sampled by ADCs (not shown) in a manner suitable for its intended use.

Figure 3B:
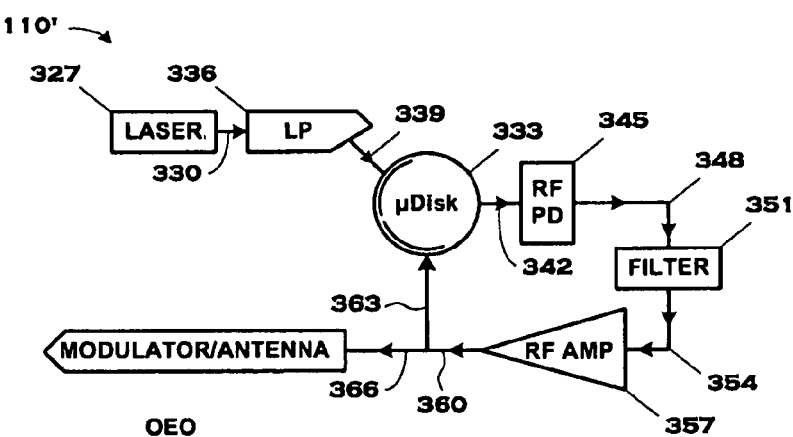

Turning now to the photonic transmitter 110', shown in FIG. 3B, a second diode laser 327 generates a laser signal 330 that enters a second electro-optically active modulator 333 through a LP 336. The electro-optically active modulator 333 converts the collimated laser signal 339 into an optical frequency signal 342, that it outputs to a photodiode satisfying the desired radio frequency bandwidth as detector 345. The photodiode detector 345 converts the optical frequency signal 342 into a radio frequency signal 348 representative thereof. The radio frequency signal 348 is then passed through a RF filter 351 and the filtered signal 354 is passed through an RF amplifier 357. The filtered and amplified RF signal 360 is then fed back to the electro-optically active modulator 333 and is output to the switch 115' through an amplifier 218, both shown in FIG. 2. The signal 360 is used for a number of functions discussed further below, such as a master frequency generator and a local oscillator.

The local oscillator ("LO") function oscillates at the frequency to which it is tuned, energized by the input laser 327. That is, the LO frequency is that of the maximum gain point of the microdisk bandwidth centered on its free spectral range ("FSR") through means of an RF feedback loop 363. The RF photodiode ("RF PD") 345 is coupled to the electro-optically active modulator 333 as a lowpass filter (though high enough to pass desired RF, e.g., S-band, X-band, Ka-band, etc.). This signal 348 is then high-passed through the RF filter 351, amplified and returned to the electro-optically active modulator 333, a sample 366 of which is forwarded to the receiver 105'.

Referring again to FIG. 3A, the OEO accesses the electro-optically active modulator 303 of the receiver 105' (though injecting into the receive line makes for less manufacturing effort). The OEO LO signal 221 modulates laser light internal to the electro-optically active modulator 303 along with target signal modulation (i.e., the RF input 300) already present, again via the electro-optic effect. Self-mixing internal to the electro-optically active modulator 303 results in the usual heterodyning action between LO and input signals 221, 300, respectively, with their resulting sum and difference frequencies passed and filtered out respectively by the baseband lowpass photodiode 321.

The modulated optical signal 324 is a sinusoidal electrical waveform at the Doppler frequency of all signals received which are low enough to clear the lowpass photodiode 321 (e.g., target(s), clutter). After ADCs (not shown) sample the composite signal 324 (target and clutter) numerical results are passed to a discrete Fourier transform (not shown) for spectral separation of each component in order to pull target from rain or ground clutter and/or other targets moving at different velocities and hence different Doppler frequencies.

Thus, the embodiment of FIG. 2 combines microwave-photonic receiver and coherent, microwave-photonic transmitter technologies. Both the receiver 105' and the transmitter 110' are based on lithium niobate (LiNbO$_3$) microdisk technology or comparable electro-optically active material. The receiver 105' accepts RF at the desired RF frequency and converts this from radio wavelengths to optical laser wavelengths via electro-optic effect of the receive microdisk 303. Baseband signals 318 resulting from laser modulation are filtered by a baseband photodiode 321 and sampled by an analog-to-digital converter ("ADC") (not shown). The baseband signals 318 are derived by internal self-mixing within the receive microdisk 303 of both target return combined with an local oscillator ("LO") signal—i.e., the LO signal 221—as generated by the transmitter 110'.

Still referring to FIG. 2, notice that, in this embodiment, no offset intermediate frequency ("IF") is provided for, though another mixer stage or stages, analog or digital, may be available at the output or input of RF signal per application requirements. Hence this particular layout acts like a Zero-IF or Direct Conversion receiver with receiver output at the Doppler frequency of a reflecting target. Note that, in some embodiments, this unit may be a variable zero-intermediate frequency radio frequency photonic transmitter-receiver unit. This radio frequency photonic transmitter-receiver unit can be the basic building block of a microwave-photonic radar as delineated below.

Figure 4:
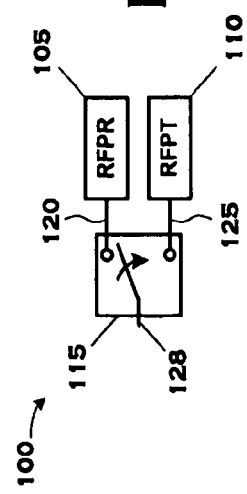
FIG. 4 illustrates the relationship of components common to both the receiver and the transmitter to open a discussion of the operation of those components.

The design and operation of the receiver 105', shown in FIG. 3A, and the transmitter section 110', shown in FIG. 3B, are centered on a similar combination of components shown in FIG. 4. These components are a laser 400, a collimating LP 403, and an electro-optically active modulator 406. Although these components are utilized somewhat differently depending on whether they are included in the receive section 105' or the transmit section 110', they are basically the same set of components.

The laser 400, the collimating LP 403, and the disk modulator 406 together, as noted above, form an injection locked external cavity diode laser ("ECDL"). The laser 400 and collimating LP 403 may be implemented in any of variety of ways known to the art to be suitable for this purpose. In the illustrated embodiment, the laser 400 is a diode laser, of which a variety are known. One particular implementation employs a semiconductor laser. The collimating LP 403 focuses the beam onto a particular point on the disk perimeter. Together, they form what is known to the art as a "wavelocker" 409.

The electro-optically active modulator 406 of the illustrated embodiments is a microstructure, and, more particularly, a microdisk. Note that the invention is not limited to disks and disk-like geometries. Other geometries have been developed and may be satisfactory for some embodiments. For example, microspheres, micro-rings, and micro-octagons have been developed. In general, however, microdisks have, to date, demonstrated superior performance in a wider range of conditions than these other geometries. The invention therefore is not limited to microdisks as the invention admits variation in this aspect of the invention.

Suitable microdisks are commercially available on specification from, for example, OEwaves, Inc., at 1010 East Union Street Pasadena, Calif. 91106; telephone: (626) 449-5000; facsimile: (626) 449-1215; or electronic mail: info@oewaves.com. Additional information is also available over the World Wide Web of the Internet at the website for OEwaves.

Design of the microdisk includes material selection, diameter, thickness and polishing of the outside perimeter. Disk diameter is made to accept the RE frequency of interest by the equation $$FSR \sim \frac{c}{n_{disk} 2\pi R}$$

where:
FSR is free spectral range, or the RF frequency to which one wants to design (e.g., S-band, X-band, Ka-band, etc.);
c is the speed of light;
$n_{disk}$ the disk resonator refractive index; and
R its radius.

The thinner a disk the more sensitive it becomes to a fixed applied voltage because modulation index, or disk sensitivity, depends on thickness by:

$$sensitivity \sim \frac{V}{d}$$

where:
V is applied RF voltage; and
d is disk thickness.

Optical polishing of the outer perimeter of the disk improves Q, i.e., narrow bandwidth. A number of materials may be selected, some better than others, as long as they are electro-optically active. One list of materials includes $C_6H_5O_2N$ (nitrobenzene), $Pb_{0.814}La_{0.124}$—$(Ti_{0.6}Zr_{0.4})O_3$ (PLZT), β-Zns, ZnSe, ZnTe, $Bi_{12}SiO_{20}$, $KH_2PO_4$ (KDP), $KD_2PO_4$ (KD*P), $CsH_2AsO_4$ (CDA), $BaTiO_3$, $SrTiO_3$, $KTa_{0.35}Nb_{0.65}O_3$ (KTN), $Ba_{0.25}Sr_{0.75}Nb_2O_6$, $LiNbO_3$, $LiTaO_3$, $Ag_3AsS_3$, and $KNbO_3$.

The basic process makes use of the electro-optic effect in which an RF voltage applied to an electro-optic material causes it to vary index of refraction at the rate of the RF oscillation. When laser light is coupled into the material and it is properly shaped such that this laser light proceeds on a continuous path allowing interaction with applied RF voltage—such as a disk allows when laser light cycles about its internal perimeter—then this laser light is modulated by index variation. In the case presented here, this modulation is simply a continuous or pulsed RF frequency tone. That tone includes a Doppler shift from the illuminated target.

Microdisks of the type shown and other, alternative structures, are known to the art. Principles of design, construction, and operation appear in the patent literature, e.g.:

U.S. Pat. No. 5,929,430, entitled "Coupled Opto-electronic Oscillator", issued Jul. 27, 1999, to California Institute of Technology as assignee of the inventors X. Steve Yao et al.;

U.S. Pat. No. 6,389,197, entitled "Coupling System to a Microsphere Cavity", issued May 14, 2002, to California Institute of Technology as assignee of the inventors Vladimir Iltchenko et al.;

U.S. Pat. No. 6,473,218, entitled "Light Modulation in Whispering-Gallery-Mode Resonators", issued Oct. 29, 2002, to California Institute of Technology as assignee of the inventors Lute Maleki et al.; and U.S. Pat. No. 7,133,180, entitled "Resonant Impedance Matching in Microwave and RF Device", issued Nov. 7, 2006, to OEwaves, Inc., as assignee of the inventors Vladimir Iltchenko et al.

Selected portions of U.S. Pat. No. 6,473,218 shall now be excerpted with some modification to further an understanding of the electro-optically active modulator 406. The electro-optically active modulators are formed from what are known as "gallery-whispering-mode resonators." Referring now to FIG. 4, the electro-optically active modulator 406 comprises a resonator 410 driven through an electrode 411. The optical energy from the input laser beam 418 is coupled to a resonator 410 in one of the whispering gallery modes through a microprism 413. The applied electrical signal—i.e., the RF input signal 415—modulates the dielectric constant of the resonator 410 and hence the phase of the whispering gallery modes. This modulates the intensity of the output from the second optical coupler.

In the illustrated embodiment, the whispering-gallery-mode resonator 410 defines a disk cavity. Optical energy can be coupled into a resonator 410 by evanescent coupling, e.g., using an optical coupler near the microdisk by less than one wavelength of the optical radiation. Such resonators have a special set of resonator modes known as "whispering gallery modes". The resonators may be designed to have a high quality factor, Q, that are only limited with attenuation of radiation in the dielectric material and the surface inhomogeneities.

The resonator 410 may be formed from any electro-optic material such as lithium niobate "or a similar electro-optic crystal". The whispering gallery modes essentially exist near the equator of the resonator 410, the resonator 410 may be not a whole sphere but a portion of the sphere near the equator that is sufficiently large to support the whispering gallery modes. Hence, rings, disks and other geometries formed from spheres may be used.

Under proper configurations, either the resonator 410 alone or the resonator 410 in connection with a proper electrical strip line—i.e., the electrode 411—can form an electrical resonator 410 to support electrical energy in the same whispering gallery modes with proper phase matching conditions. Hence, electrical and optical wave 426s can coexist and co-propagate in certain whispering gallery modes. When the resonator 410 is formed of an electro-optic material, the electrical wave can be used to alter or modulate the dielectric constant of the resonator 410 and hence modulate the light based on the electro-optic effects.

FIG. 5A shows a disk-like whispering gallery mode resonator 410 such as that used in the illustrated embodiment. It is formed from a sphere (not shown) by removing top and bottom portions of the sphere to leave a portion containing the sphere equator 500. This embodiment of the resonator 410 includes a top circular surface 510 and a bottom circular surface 520, both with diameters less than the diameter of the original sphere. The side surface 530 may be a spherical surface. The spacing, d, between the top and bottom surfaces 510 and 520 is sufficiently large that the optical and electrical modes centered at the equator 500 remain essentially undisturbed by the geometry. A small spacing d can be used to achieve a sufficient electrical field strength for the electro-optic modulation at a low voltage, e.g., on the order of millivolts.

In general, the optic axis of the electro-optic material for the resonator 410 may be in any direction. FIG. 5B shows a disk configuration where the optical c-axis 503 is different from the z-axis 502 perpendicular to the equatorial circular plane. In certain applications, the optical c-axis 503 may be aligned with the z-axis 502 as in FIG. 5A.

The optical modulator 500 in FIG. 5 may support RF (i.e., mm and microwave) signals, and light, simultaneously in a sphere of material with the electro-optic effect. Lithium niobate, for example, changes its real part of the index of refraction in response to the applied is electric field. Other materials may respond to the electric field differently. Multiple quantum well structures of III-V compounds, for example, change their imaginary part of the index of refraction when the electric field is applied.

FIG. 6, FIG. 7, and FIG. 8 show examples of the microstrip line electrode 600 when the resonator 410 is similar to the disk configuration shown in FIG. 5A and FIG. 5B. In FIG. 6, the electrode 600 is formed on the top surface of the resonator 410 and another electrode 610 is formed in contact with the bottom surface of the resonator 410. FIG. 7 shows a half-circuit microstrip line as the top electrode 600 on the rim of the top surface. FIG. 8 shows two pieces of circular microstrip lines 600A and 600B (solid lines) as the top electrode 600 and two pieces of circular microstrip lines 610A and 610B as bottom electrodes (broken lines with shades).

Figure 9:
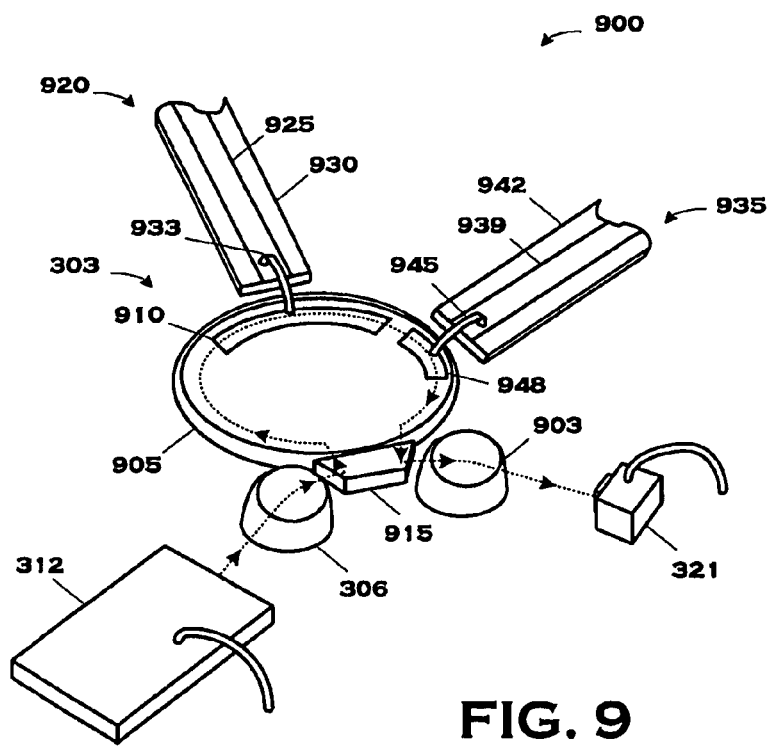
FIG. 9 is a mechanical drawing of one particular embodiment of the receiver of FIG. 3A.

The invention admits some variation in implementation specific detail. FIG. 9 is a mechanical drawing of one particular embodiment 900 of the receiver 105' shown in FIG. 3A and shows a LP 903 not found in FIG. 3A. Similarly, in some embodiments, the lenses of the LPs 306, 336 may be replaced by lens assemblies (not shown) comprising more than one lens. Still other variations not shown might also be desirable in still other embodiments.

Another variation may be found in the implementation of the switch 115. The switch 115 is shown, conceptually, in FIG. 1, as a double pole, single throw switch. The invention is not so limited, as is evidenced by the disclosure herein of embodiments employing circulators. However, such a switch could be employed in some embodiments. The switch 125 let in the receive position until time to transmit, wherein it is thrown until transmission is completed, whereupon it is returned to the receive position. Other embodiments may employ alternative switching strategies and implementations. These and other such variations will be encountered in alternative embodiments and will arise from implementation specific considerations and design constraints.

Thus, the particular structure and acts set forth herein are, by way of example and illustration, but one set of means for performing the disclosed functionality. For example, referring to FIG. 3A-FIG. 3B:

the diode lasers 312, 327 are but one means for generating a laser signal;

the LPs 306, 336 are but one means for collimating the laser signal, and, in turn, for focusing the laser signal onto the microdisks 303, 333;

the microdisks 303, 333 are but one means for electro-optically, actively modulating the collimated laser signal with a received radio frequency signal; and the microdisks 303, 333 are but one means for generating a radio frequency signal from an optical signal output by the laser generating means and received through the collimating means; and the photodiodes 321, 345 are but one means for detecting the modulated laser signals.

Some of these alternative means are set forth in the specification. For instance, the microdisks may be replaced using any of a variety of microstructures as previously described. Others will become apparent to those skilled in the art having the benefit of this disclosure.

Turning now to FIG. 9, the drive mechanism for the electro-optically active modulator 303 will now be described in the illustrated embodiment. The electro-optically active modulator 303 is shown comprising a disk resonator 905 and a drive electrode 910 as described above relative to FIG. 5-FIG. 8 and a microprism 915. The drive mechanism 920 comprises a RF microstrip 925 formed in a substrate 930 that is wire bonded by a lead 933 to the electrode 910 of the electro-optically active modulator 303. FIG. 9 also illustrates the local oscillator feed 935, which comprises a RF microstrip 939 formed in a substrate 942 that is wire bonded by a lead 945 to a second electrode 948.

Techniques for the manufacture of RF microstrips and use are well known in the art. Those skilled in the art will be able to readily adapt conventional techniques to the present invention. However, alternative embodiments may employ alternative technologies, such as printed circuit board ("PCB") or printed wiring board ("PWB") technologies that will also be readily adaptable.

Figure 10:
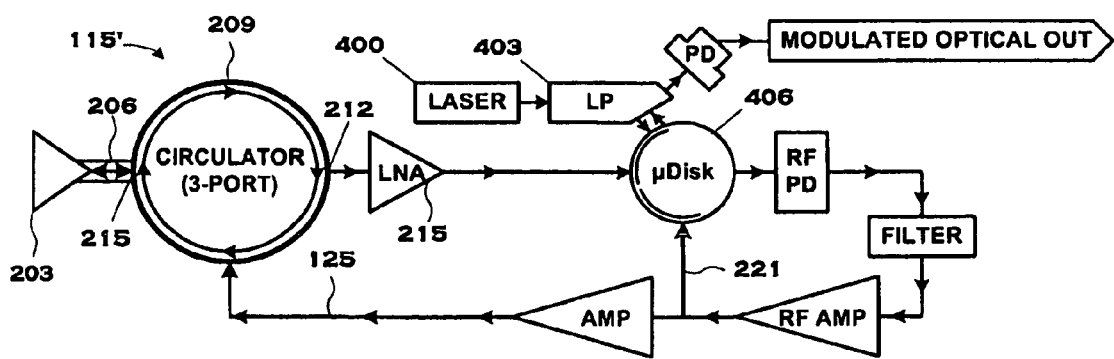
FIG. 10 illustrates an embodiment in which the receiver section and the transmitter section are combined by sharing the same electro-optically active modulator.

Note that, in the embodiment of FIG. 2, the receiver section 105' and the transmitter section 110' are separated even though they use similar designs. The receiver section 105' and the transmitter section 110' may be combined in some embodiments, both sharing the same microdisk. Such an embodiment is shown in FIG. 10. However, there is risk of pulling the resonant frequency of the disk 406 by injection locking to received signals close to but different from resonance when such inputs are at high levels (i.e., high power Doppler returns at close approach). The illustrated embodiment therefore separates the receiver section 105' from the transmitter section 110' to prevent this occurrence.

Figure 11:
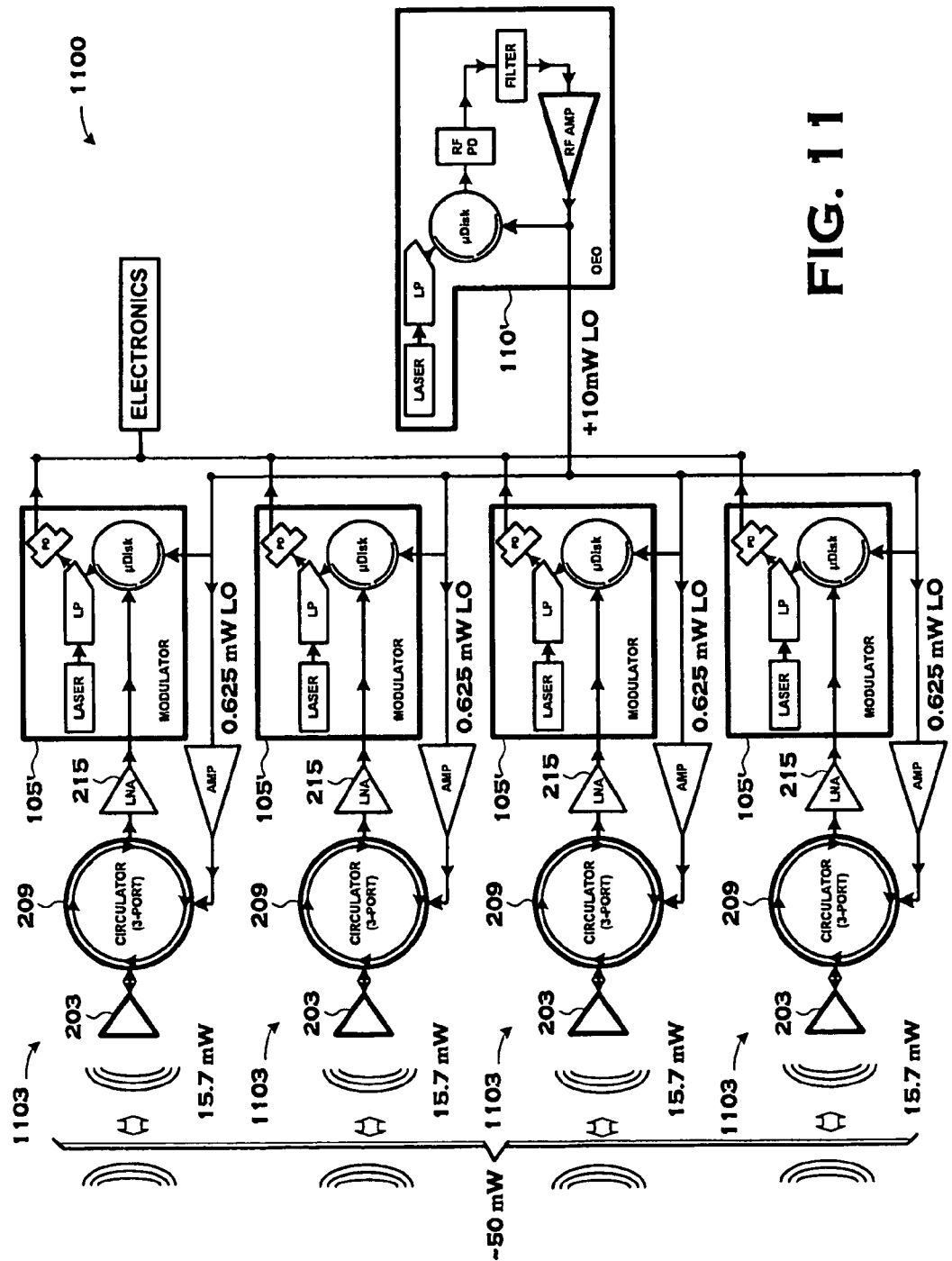
FIG. 11 shows one concept application in which a single opto-electronic oscillator ("OEO") local oscillator ("LO") is used to feed four receive channels as in monopulse radar architecture using the transceiver of FIG. 2.

FIG. 11 shows one concept application 1200 in which a single OEO LO 110' is used to feed four receive channels 1203 as in monopulse radar architecture. A mixer conversion gain is assumed due to high power OEO LO as compared to received RF. This value decreases once target signal level nears LO power. For this example, analysis has shown that for a particular target RCS, at least 50 mW of peak transmit power is required in 4 mm/hr of rain at a range of 500 m. Power loss and division of a typical 10 mW OEO output requires 17 dB transmit amplification before additional losses in the circulator, feed network and antenna result in transmit powers of ~16 mW per channel, spatially combined to exceed 50 mW on the mainbeam center axis.

This same OEO LO signal is shared with each receive channel as a phase reference against which target return is mixed in the usual process of coherent detection. Using this OEO LO as both receive reference and transmit signal ensures phase coherence required for Doppler processing. Notice that Doppler processing may be pulse Doppler, requiring pulse amplification output, or linear frequency modulation ("LFM"), requiring a ramp output from the OEO, as determined by the particular application.

Figure 12:
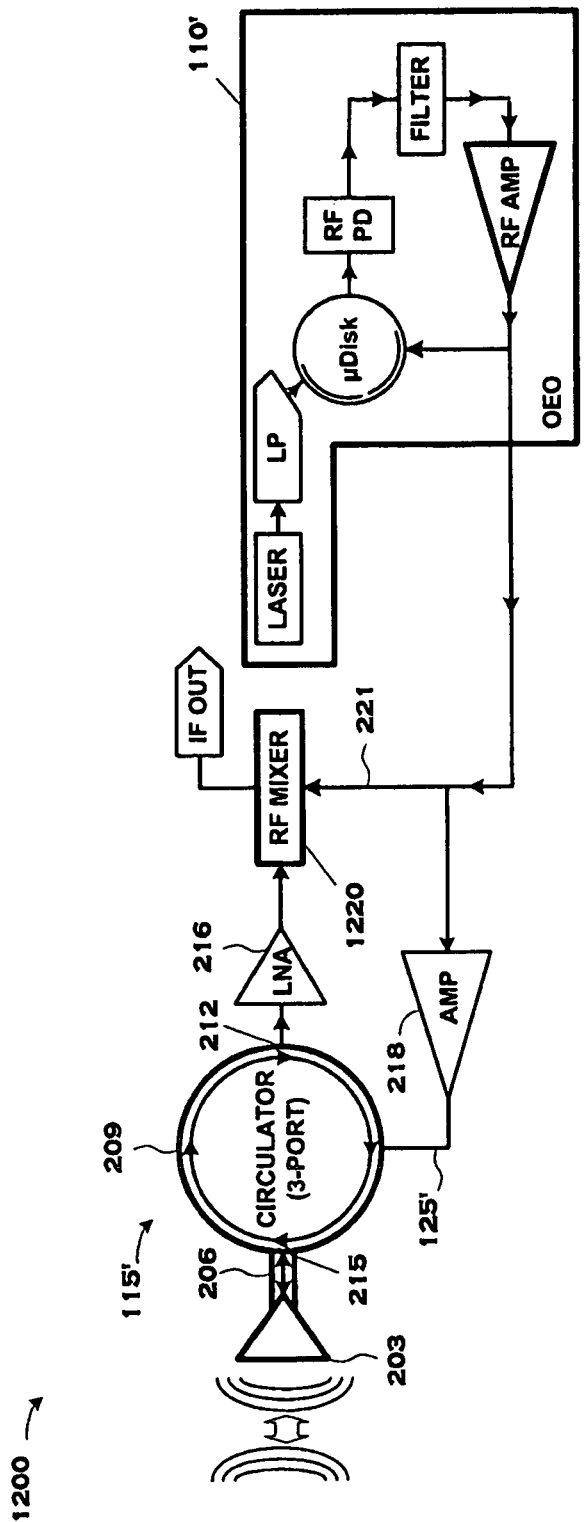
FIG. 12 depicts an alternative embodiment in a block diagram in which that photonic receiver of the radio frequency photonic transceiver in FIG. 1 has been replaced by a conventional radio frequency mixer.
Figure 13:
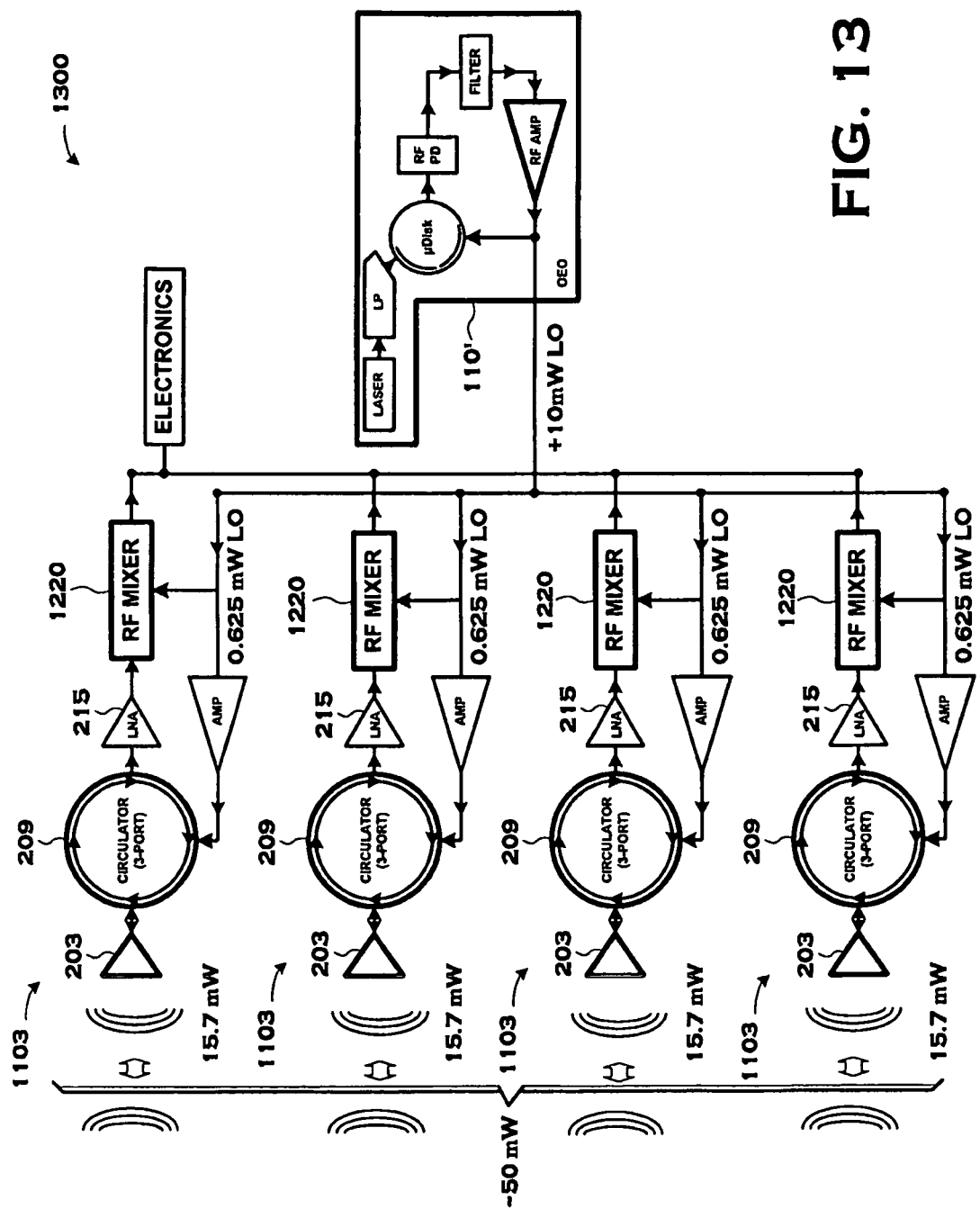
FIG. 13 shows a concept application in which a single opto-electronic oscillator ("OEO") local oscillator ("LO") is used to feed four receive channels as in monopulse radar architecture using the transceiver of FIG. 12.

Note that not all embodiments of the present invention FIG. 12 depicts an alternative embodiment employing a photonic transceiver 1200 in a block diagram in which the photonic receiver 105 of the radio frequency photonic transceiver 100 in FIG. 1 has been replaced by a conventional radio frequency mixer 1220. Similarly, FIG. 13 shows a concept application in which a single opto-electronic oscillator ("OEO") local oscillator ("LO") is used to feed four receive channels as in monopulse radar architecture using the transceiver of FIG. 12 using the photonic transceiver 1200 of FIG. 12.

Thus, the present invention generally provides coherent operation in a lightweight, miniature device. In some embodiments, neither the receiver nor the oscillator of the transmitter have powered mixers. Radio wavelengths are converted in the photonics to light wavelengths yielding small size with ideal device and channel isolation difficult to achieve in RF. The master frequency source does not multiply phase noise to the RF transmit frequency as any RF frequency may be chosen by a simple change in disk dimensions deriving RF from 200 THz light.

Antenna output enters a circulator directing received signals to the receive section, to an LNA and finally to the modulator via RF-resonator horseshoe atop the disk. This RF voltage modulates disk index of refraction at the RF frequency thereby modulating laser light internal to the disk converting radio wavelengths to optical laser wavelengths via electro-optic effect. The modulator is evanescent wave coupled to an injection locked ECDL (external cavity diode laser) creating a wavelocker of ~200 THz optical laser frequency in the kHz range or less for linewidth. Laser light trapped in the whispering gallery mode of the disk cycles about the periphery before exit via evanescent coupling. It is during these multiple cycles that RF modulates laser light, imposing the information we desire (Doppler frequency) on an IR carrier.

Thus, in some embodiments two photonic devices, both based on LiNbO3 (lithium niobate) microdisk technology, one a modulator receive unit, the other acting as an LO/MFG (master frequency generator), may be combined in the form of a transmit-receive module. A four channel photonic receiver occupies a single card 1.08" in diameter (size of a quarter). The LO is approximately ¼th of this. Dense packaging of such units can be combined as an option to traditional TR-modules and the dense microstrip phased array previously investigated in another area.

A photonics approach provides miniature volumes (fractions of a cubic inch, 0.02 in cubed for a single modulator receiver channel including all support elements). No powered mixers are required, only the electro-optic effect of $LiNbO_3$. Complete isolation is provided between channels due to all optical connections vs. RF cross talk problematic in microwave TR modules.

The OEO LO oscillates at the frequency to which the OEO is tuned, energized by an input laser. That is, the OEO frequency is that of the maximum gain point of the microdisk bandwidth centered on its FSR (free spectral range) through means of an RF feedback loop. An RF photodiode (RF PD) is coupled to the OEO disk as a lowpass filter (though high enough to pass desired RF, e.g. S-band, X-band, Ka-band, etc.). This signal is then high-passed through an RF filter, amplified and returned to the modulator, a sample of which is forwarded to the receive section.

The OEO makes access to the receiver microdisk as shown by a second horseshoe RF-resonator (though injecting into the receive line makes for less manufacturing effort). The OEO LO modulates laser light internal to the disk with target signal modulation already present, again via the electro-optic effect. Self-mixing internal to the disk results in the usual heterodyning action between LO and input signals with their resulting sum and difference frequencies passed and filtered out respectively by the baseband lowpass photodiode of the receive section. Output is a sinusoidal electrical waveform at the Doppler frequency of all signals received which are low enough to clear the lowpass photodiode (target(s), clutter). Using this OEO LO as both receive reference and transmit signal ensures phase coherence required for Doppler processing. Each OEO in an array can be easily phase locked to the others.

Note that not every embodiment will necessarily possess all the characteristics nor exhibit all the advantages discussed above to the same degree or in the same way.

The following references are hereby incorporated by reference for the noted purposes as if set forth verbatim herein:

U.S. Pat. No. 5,929,430, entitled "Coupled Opto-electronic Oscillator", issued Jul. 27, 1999, to California Institute of Technology as assignee of the inventors X.

Steve Yao et al., for disclosure regarding design, construction, and operation of electro-optically active modulators;

U.S. Pat. No. 6,389,197, entitled "Coupling System to a Microsphere Cavity", issued May 14, 2002, to California Institute of Technology as assignee of the inventors Vladimir Iltchenko et al., for disclosure regarding design, construction, and operation of electro-optically active modulators;

U.S. Pat. No. 6,473,218, entitled "Light Modulation in Whispering-Gallery-Mode Resonators", issued Oct. 29, 2002, to California Institute of Technology as assignee of the inventors Lute Maleki et al., for disclosure regarding design, construction, and operation of electro-optically active modulators;

U.S. Pat. No. 7,133,180, entitled "Resonant Impedance Matching in Microwave and RF Device", issued Nov. 7, 2006, to OEwaves, Inc., as assignee of the inventors Vladimir Iltchenko et al., for disclosure regarding design, construction, and operation of electro-optically active modulators; and U.S. application Ser. No. 11/421,504, entitled "Millimeter Wave Electonically Scanned Antenna", filed Jun. 1, 2006, in the name of Cole A. Chandler, and commonly assigned herewith, for disclosure regarding design, construction, and operation of RF microstrips.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A radio frequency photonic transceiver, comprising:
    a radio frequency receiver comprising:
        an input configured to receive a first radio frequency signal; and
        a first electro-optically active modulator configured to convert the first radio frequency signal into an optical frequency signal, wherein the first electro-optically active modulator includes a first microdisk;
    a radio frequency photonic transmitter comprising:
        a second electro-optically active modulator configured to convert a laser signal into a modified optical frequency signal, wherein the second electro-optically active modulator includes a second microdisk; and
        an optical detector configured to convert the modified optical frequency signal into a second radio frequency signal that, in operation, provides a reference signal to the first microdisk of the radio frequency receiver, a feedback signal to the second microdisk of the radio frequency photonic transmitter, and an output signal at an antenna; and
    a switch between the input of the radio frequency receiver and an output of the radio frequency photonic transmitter.

2. The radio frequency photonic transceiver of claim 1, wherein the radio frequency receiver comprises a radio frequency mixer.

3. The radio frequency photonic transceiver of claim 1, wherein the radio frequency receiver comprises a radio frequency photonic receiver.

4. The radio frequency photonic transceiver of claim 3, wherein the radio frequency photonic receiver includes:
    a first laser configured to output a first laser signal;
    a lens;
    a prism, wherein
    the first electro-optically active modulator is evanescent-wave coupled to the prism to modulate the first laser signal output by the first laser and transmitted through the lens and into the prism with the first radio frequency signal and the second radio frequency signal generated by the radio frequency photonic transmitter; and
    another optical detector capable of detecting a modulated laser signal from the first electro-optically active modulator.

5. The radio frequency photonic transceiver of claim 1, wherein the radio frequency photonic transmitter includes:
    a laser configured to output a laser signal;
    a lens;
    a prism, wherein
    the second electro-optically active modulator is evanescent-wave coupled to the prism to generate the modified optical frequency signal from the laser signal output by the laser and received through the lens and into the prism; and
    the optical detector is capable of detecting the modified optical frequency signal output from the second electro-optically active modulator and configured to convert the modified optical frequency signal into a radio frequency signal representative thereof.

6. The radio frequency photonic transceiver of claim 1, wherein the switch comprises a circulator.

7. The radio frequency photonic transceiver of claim 1, further comprising an antenna through which the radio frequency receiver can receive and through which the radio frequency photonic transmitter can transmit.

8. A radio frequency photonic transceiver, comprising:
    means for generating a radio frequency modulated optical frequency signal, including:
        means for generating a first laser signal;
        means for focusing the first laser signal;
        means for electro-optically modulating the focused first laser signal with a received first radio frequency signal, wherein the means for electro-optically modulating the focused first laser signal includes a first microdisk; and
        means for detecting the modulated first laser signal;
    a radio frequency photonic transmitter, including:
        means for generating a second laser signal;
        means for focusing the second laser signal;
        means for generating a second radio frequency modulated optical frequency signal from
    the second laser signal output by the means for generating the second laser signal and received from the means for focusing the second laser signal, wherein the means for generating the second radio frequency modulated optical frequency signal includes a second microdisk;
        means for detecting the radio frequency modulated optical frequency signal and for converting the radio frequency modulated optical frequency signal into a converted second radio frequency signal representative thereof; and
        means for transmitting the second radio frequency signal to the first microdisk; and means for switching between an input of the means for generating a radio frequency modulated optical frequency signal and an output of the radio frequency photonic transmitter.

9. The radio frequency photonic transceiver of claim 8, wherein the means for generating the first laser signal includes a laser.

10. The radio frequency photonic transceiver of claim 8, wherein the means for focusing the first laser signal includes a lens.

11. The radio frequency photonic transceiver of claim 8, wherein the means for electro-optically modulating the focused first laser signal includes an electro-optically active modulator that is evanescent-wave coupled to the means for focusing the first laser signal.

12. The radio frequency photonic transceiver of claim 11, wherein the electro-optically active modulator includes the first microdisk.

13. The radio frequency photonic transceiver of claim 8, wherein the means for detecting the radio frequency modulated optical frequency signal includes an optical detector.

14. The radio frequency photonic transceiver of claim 8, wherein the means for focusing the second laser signal comprises a lens.

15. The radio frequency photonic transceiver of claim 8, wherein the means for generating the radio frequency modulated optical frequency signal comprises an electro-optically active modulator that is evanescent-wave coupled to the means for focusing the second laser signal.

16. The radio frequency photonic transceiver of claim 15, wherein the electro-optically active modulator includes the second microdisk.

17. The radio frequency photonic transceiver of claim 8, wherein the means for detecting the radio frequency modulated optical frequency signal comprises an optical detector.

18. The radio frequency photonic transceiver of claim 8, wherein the means for switching comprises a circulator.

19. The radio frequency photonic transceiver of claim 8, further comprising an antenna through which the means for generating the radio frequency modulated optical frequency signal can receive and through which the radio frequency photonic transmitter can transmit.

20. A method comprising:
receiving a first radio frequency signal, including:
acquiring the first radio frequency signal through an antenna; and
converting, by an electro-optically active modulator having a first microdisk, the acquired first radio frequency signal to a first radio frequency modulated optical frequency signal representing the first radio frequency signal;
transmitting a second radio frequency signal, including:
generating a second radio frequency modulated optical frequency signal using a second microdisk;
converting the second radio frequency modulated optical frequency signal to the second radio frequency signal; and
transmitting the second radio frequency signal through the antenna;
referencing the acquired first radio frequency signal with the second radio frequency signal when converting the acquired first radio frequency signal to the first radio frequency modulated optical frequency signal; and
switching between receiving the first radio frequency signal through the antenna and transmitting the second radio frequency signal through the antenna.

21. The method of claim 20, wherein converting the acquired first radio frequency signal includes:
generating a laser signal;
focusing the laser signal;
electro-optically modulating the focused laser signal with the acquired first radio frequency signal; and
detecting the modulated laser signal.

22. The method of claim 20, wherein generating the second radio frequency modulated optical frequency signal includes:
generating a laser signal;
focusing the generated laser signal; and
electro-optically modulating the focused laser signal.

23. The method of claim 22, wherein converting the second radio frequency modulated optical frequency signal to the second radio frequency signal includes detecting the electro-optically modulated focused laser signal.

24. The method of claim 20, wherein converting the second radio frequency modulated optical frequency signal to the second radio frequency signal includes detecting the second radio frequency modulated optical frequency signal with an optical detector.

25. The method of claim 20, wherein receiving the first radio frequency signal includes modulating the first radio frequency modulated optical frequency signal with the second radio frequency signal.

26. A method comprising:
generating an output signal for transmission by an antenna, wherein the generating an output signal comprises:
generating a first laser signal onto a first prism;
converting the first laser signal into a modified optical frequency signal;
converting the modified optical frequency signal into a first radio frequency signal using a microdisk;
filtering and amplifying the first radio frequency signal to generate the output signal at a first frequency; and
outputting the output signal to the antenna;
switching the antenna from a transmitting mode to a receiving mode;
receiving a second radio frequency signal at the antenna, wherein the second radio frequency signal is caused by the output signal reflecting off an object;
mixing the second radio frequency signal with the first radio frequency signal to generate a received signal representative of a phase difference between the second radio frequency signal and the first radio frequency signal, wherein the mixing comprises:
generating a second laser signal onto a second prism; and
converting the second laser signal into a second modified optical frequency signal by modulating the second laser signal with the second radio frequency signal and the first radio frequency signal; and
outputting the received signal.

* * * * *